United States Patent
Dominique et al.

(10) Patent No.: US 7,519,382 B2
(45) Date of Patent: Apr. 14, 2009

(54) METHOD OF POWER CONTROL FOR CALL MIGRATION

(75) Inventors: Francis Dominique, Rockaway, NJ (US); Hongwel Kong, Denville, NJ (US); Walid E. Nabhane, Bedminster, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 584 days.

(21) Appl. No.: 11/094,419

(22) Filed: Mar. 31, 2005

(65) Prior Publication Data

US 2006/0229096 A1    Oct. 12, 2006

(51) Int. Cl.
H04B 7/00    (2006.01)

(52) U.S. Cl. .................. 455/522; 455/523; 455/436

(58) Field of Classification Search ............. 455/522, 455/523
See application file for complete search history.

(56) References Cited

U.S. PATENT DOCUMENTS

| | | | | |
|---|---|---|---|---|
| 6,038,220 A * | 3/2000 | Kang et al. | | 370/252 |
| 6,594,499 B1 * | 7/2003 | Andersson et al. | | 455/522 |
| 7,155,250 B2 * | 12/2006 | Chen et al. | | 455/522 |
| 7,289,484 B2 * | 10/2007 | Guturu et al. | | 370/343 |
| 2004/0043768 A1 * | 3/2004 | Pelletier | | 455/436 |
| 2004/0063453 A1 * | 4/2004 | Koo et al. | | 455/522 |
| 2004/0180685 A1 | 9/2004 | Chen et al. | | |
| 2004/0209636 A1 * | 10/2004 | Chen et al. | | 455/522 |
| 2004/0259584 A1 * | 12/2004 | Murata et al. | | 455/522 |

OTHER PUBLICATIONS

Marc Schinnenburg, Ingo Forkel, Bert Haverkamp: "Realization and Optimization of Soft and Softer Handover in UMTS Networks" Proc. European Personal and Mobile Communications Conference (EPMCC), Apr. 2003, pp. 1-5, XP002395641 Glasgow, Scotland, UK p. 1-p. 2; figure 1.

"Universal Mobile Telecommunications System (UMTS); UTRAN Iub interface NBAP signaling (3GPP TS 25.433 version 5.12.0 Release 5); ETSI TS 125 433" ETSI Standards, European Telecommunications Standards Institute, Sophia-Antipo, FR, vol. 3-R3, No. V5120, Mar. 2005; XP014027701 ISSN: 0000-0001 p. 118-p. 119.

NEC and Telecom Modus: "A method utilizing DL reference power to avoid power drifting" TSG-RAN Working Group 3 Meeting #7, No. R3-99b46, Sep. 20, 1999, pp. 1-4, XP002395545 Sophia Antipolis, France the whole document.

* cited by examiner

Primary Examiner—Matthew D Anderson
Assistant Examiner—Adel Youssef

(57) ABSTRACT

In a method of controlling transmit power for a user call migrating between a first entity and a second entity in a base station of a wireless communication system, power control may be performed, as a call of the user is migrated from the first to the second entity, or vice versa, based on an adjustment ratio value. Parameters for balancing transmit power as the user call is migrated from the first entity to the second entity may be selected so that any difference in transmit power does not adversely affect system performance.

7 Claims, 1 Drawing Sheet

METHOD OF POWER CONTROL FOR CALL MIGRATION

BACKGROUND OF THE INVENTION

1. Field of the Invention

The present invention relates generally to methods of controlling transmit power for a user call migrating between entities in a base station of a wireless communication systems or networks.

2. Description of the Related Art

Wireless communication systems typically include a plurality of base stations, where one or more base stations may serve a geographic area commonly referred to as a cell. Users of the wireless communication system may communicate with each other and/or with the communication system. The physical equipment at the base stations may be referred to as system equipment. In wireless communication systems, communication can occur between two mobile stations (e.g., two cell phones, wireless computers, PDAs, etc.) and/or between mobiles and system equipment.

The communication system typically may operate in accordance with established rules promulgated by governmental and/or industry groups. These rules are typically established as standards by which wireless communication systems are to be in compliance with. The standards may contain various protocols that dictate the operation of the wireless communication systems. Generally, a protocol may be understood as a set of rules that may specify how communication (voice and/or data) within a given communication system may be initiated, maintained and/or terminated.

A mobile located in a particular cell being served by a base station communicates with other mobiles and/or with other communication systems via the base station. The signals from the mobile may be transmitted to a receiving mobile or to another communication system via the base station of the cell within which the mobile is located.

As a mobile move through cells being served by different base stations, communication from the mobile may be handled by different base stations. For example, communication for a mobile moving from one cell to another cell may be transferred from one base station to another base station of the cell. The process in which communication for a mobile is transferred from one base station (i.e., the 'original' base station) to another base station (i.e., the 'target' base station) is known as "handoff." A mobile located at the edge of a serving cell and in the vicinity or near a target cell typically will request a handoff to the target cell, depending on the relative strength of communication signals of neighboring base stations.

In wireless communication systems or networks, the base stations (also commonly referred to as a Node-B) typically may transmit pilot signals periodically. The mobiles receive these pilot signals and may be configured so as to measure the strength of these pilot signals. A mobile may request a handoff to one or more base stations based on the relative measured strengths of the pilot signals of the base stations. The network may also trigger a handoff procedure based on periodic measurement reports received from a given mobile, or for other reasons such as congestion in a cell that a given mobile is connected to.

One type of handoff used in several spread spectrum-based wireless communication systems such as Code Division Multiple Access (CDMA) systems is referred to as a soft handoff. In a soft handoff, communication with the target base station may be established prior to communication with the original base station is terminated. Also during soft handoff, the mobile may typically be in simultaneous communication with greater than one base station. In this manner, no interruption of communication to and from the mobile occurs. Eventually, when the soft handoff has terminated, the mobile communicates with another mobile or another communication system via the target base station.

Power control is used in both the downlink (base station to mobile) and uplink (mobile to base station) of CDMA systems to reduce interference and/or to ensure a desired target block error rate. For each dedicated channel, there is a closed loop to control transmitter power. This is commonly known as inner loop power control.

For downlink power control, the mobile measures received signal to interference ratio (SIR) and may issue an up power command in the uplink if the measured SIR is below a given threshold. Otherwise, the mobile issues a down power command in the uplink to the base station where measured SIR exceeds the threshold. This power control command (TPC) may be transmitted periodically to the base station(s) to which mobile is connected. The period of TPC may be referred to as a slot or power control group. If a mobile is in soft handoff, all base stations in communication with the mobile receive the TPC command that is transmitted in the uplink.

For uplink power control, each base station measures received SIR of a given mobile and may issue an up power command on the downlink to the mobile, if the measured SIR is below a given threshold. This threshold may be referred to as 'SIR target'. If the measured SIR exceeds SIR target, the base station issues a down power command. The SIR target itself may be adjusted based on the number of errors in the received blocks from the mobile. If a received block is erroneous the SIR target is raised, otherwise the SIR target is lowered where the received block is not erroneous.

During soft handoff, each base station in communication with the mobile does not decode the same TPC command transmitted in the uplink (UL) due to the difference of the wireless channel paths between the mobile and each base station. If the channel is not fading between the base station and the mobile, the probability of errors on the decoded TPC commands by the base station is relatively low, and is relatively high in case of deep fading. In the case of deep fading, the TPC commands received are generally random, thus disrupting inner loop power control and potentially unnecessarily increasing the transmitted power of the weak link. Because the inner loop power control processing at each base station responds to the TPC commands it receives, cumulative TPC bit errors may cause the base station transmit power to drift substantially from the target power, potentially leading to capacity loss and/or call drops during handoff. Since desired downlink capacity may be achieved where the transmit power values of all base stations in the mobile's active set are the same or nearly the same, a mechanism to synchronize the transmitted power levels of each base station in the active set is desired.

A power adjustment procedure known as power balancing is used in most if not all wireless standards to remove what is known as the random walk effect. The random walk effect refers to the downlink transmit power level drifting away from the desired power level due to recovered power control command errors in the uplink receiver. This is especially true for the weak links in soft handoff scenarios. For weak links, the power control command error rate is high. Therefore when the downlink transmit power level follows the erroneous power control command received from the uplink, it starts to wander away from the desired level. For high error rate of power control command, the error pattern looks random, therefore the trajectory of the downlink power level resembles that of the foot steps of a drunken man, hence the name 'random walk'. Since the drifting can be detected by comparing the actual long-term transmit power level with the desired one, power balancing procedure is started once this condition is detected, by pulling the downlink power levels in the direction such that its long-term average goes back to the desired power level.

There are several situations within a base station where a user call being served by that base station needs to be moved from one physical entity (i.e., a board) in the base station to another board. The reasons for moving a call from one entity to another entity in the Node-B may include, but are not limited to, reconfiguration of the data size to be transmitted to the mobile and certain handoff scenarios. In the data size reconfiguration scenario, the physical entity in the Node B currently handling the user call cannot deal with the new data size; thus the call needs to be transferred to another physical entity at the Node B capable of delivering the data. In an example handoff scenario, a call may be moved from one entity to another entity in the Node B where the mobile needs, after moving to a new sector, to be physically located on an entity that deals with the new sector.

The procedure of moving a user call between entities in a Node-B may be referred to as "call migration". It is desirable that call migration be performed in a way that is substantially transparent to any entity outside of the base station and in a substantially short period of time (i.e., it should be at least an order of magnitude smaller than the reconfiguration time for migrating the call from one entity to another in the Node-B). In other words, the data to be received and transmitted, along with the power to be transmitted, should be able to continue in a continuous manner with no interruption.

Additionally, performing call migration transparently means that the power of the last slot to be transmitted from the 'old' physical entity (previously handling the user call) is to be an input to the computation of the power for the first slot to be transmitted from the new physical entity taking the migrated call. Since communication latency between physical entities in a Node-B typically may be about one to two orders of magnitude greater than slot duration reducing and/ or potentially eliminating this latency for call migration between entities may be desirable.

SUMMARY OF THE INVENTION

An example embodiment of the present invention is directed to a method of controlling transmit power for a user call migrating between a first entity and a second entity in a base station. In the method, power control may be performed, as a call of the user is migrated from the first to the second entity, or vice versa, based on an adjustment ratio value.

Another example embodiment is directed to method of selecting parameters for balancing transmit power as a user call is migrated from a first entity to a second entity within a base station of a wireless communication system. In the method, one or more parameters for balancing transmit power between the entities as the user call is migrated may be selected so that any difference in transmit power does not adversely affect system performance.

BRIEF DESCRIPTION OF THE DRAWINGS

The example embodiments of the present invention will become more fully understood from the detailed description given herein below and the accompanying drawings, wherein like elements are represented by like reference numerals, which are given by way of illustration only and thus are not limitative of the example embodiments of the present invention.

DETAILED DESCRIPTION OF THE EXAMPLE EMBODIMENTS

Figure 1:
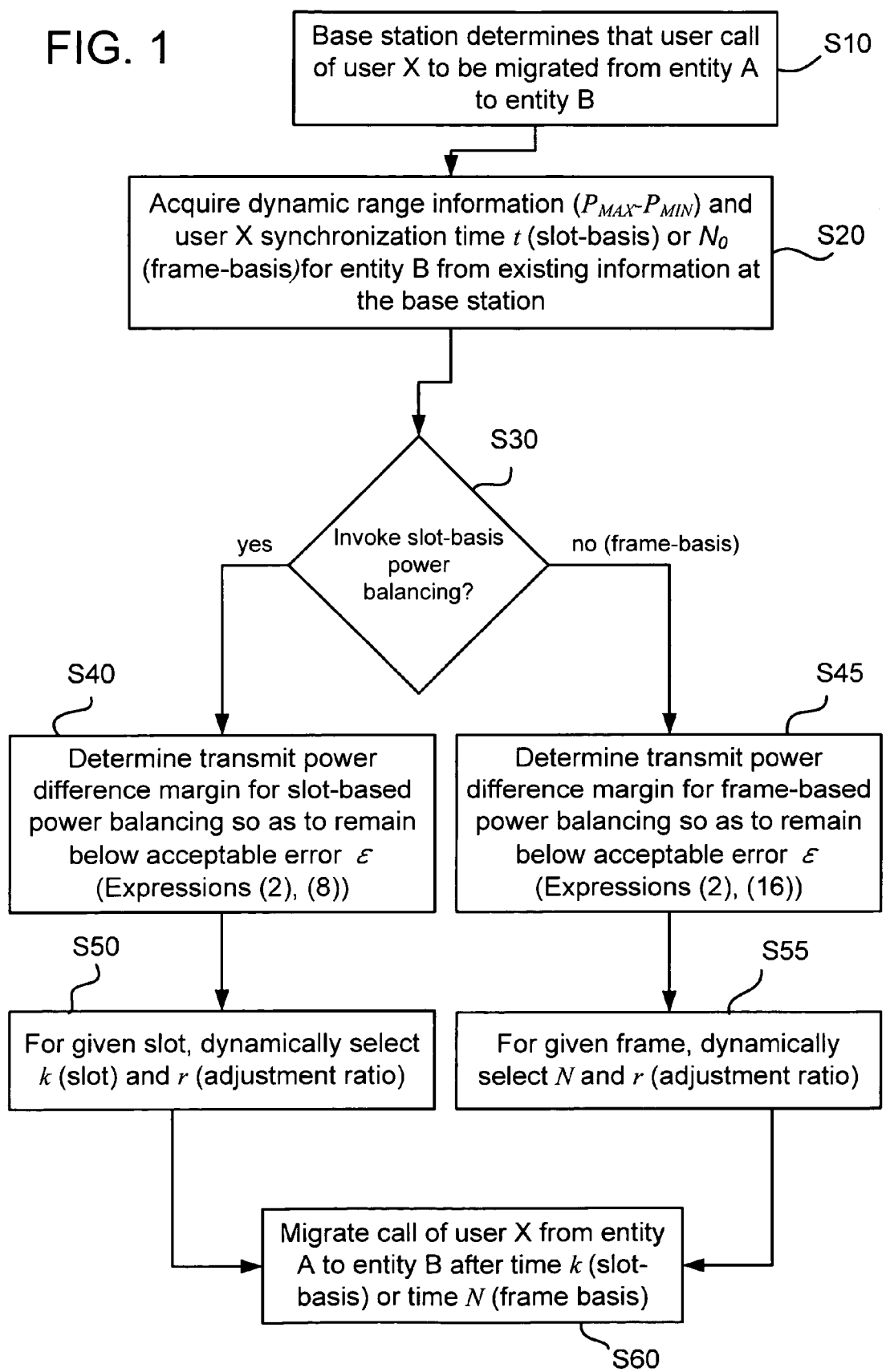
FIG. 1 is a flow diagram illustrating a general process flow for controlling transmit power for a user call migrating between a first entity and a second entity in a base station, in accordance with an example embodiment of the present invention.

Although the following description relates to power balancing for call migration to maintain power control between entities within a base station of a network is based on UMTS technologies, and will be described in this example context, the example methodology may be applicable to any of CDMA (IS95, cdma2000 and various technology variations), various UMTS technologies and/or standards (release 99, R4, R5, R6 and above), GSM, 802.11 and/or related technologies. Thus, the example embodiments shown and described herein are meant to be illustrative only and not limiting in any way. As such, various modifications will be apparent to those skilled in the art for application to communication systems or networks based on technologies other than the above, which may be in various stages of development and intended for future replacement of, or use with, the above networks or systems.

As used herein, the terms mobile or mobile station may be synonymous to a mobile user, user equipment (UE), user, subscriber, wireless terminal and/or remote station, and may describe a remote user of wireless resources in a wireless communication network. Where used below, the term base station is synonymous with base transceiver station or Node-B and may describe equipment that provides voice and/or data connectivity between a communication network and one or more mobile stations. Occasionally herein the terms Node-B and base station may be used interchangeably.

In general, the example embodiments of the present invention are directed to a methodology which may provide downlink power control for a user in the Node-B that is continuous and transparent when a call migration of a user's call is required as between entities within the Node-B.

In general, and for whatever reason, a base station may need to migrate a call of a user X from a physical entity A within the base station to a physical entity B in the base station. The physical entities may be boards in the base station; however, the example embodiments are not so limited. The physical entities may be different physical devices on the same board, or different circuit boards physically sitting in different chassis, etc. The base station initiates the migration by adding user X on physical entity B, but in this time forces the downlink to be started in a silent mode on physical entity B. Once user X achieves uplink synchronization in entity B and is now aligned on the uplink with user X on physical entity A (same data decoded), the base station can apply methodology to ensure that the downlink transmit power levels for user X on physical entities A and B are aligned (so that power level differences between the two entities are within a given or pre-determined accuracy requirement). Once this is achieved, the base station can stop transmission to user X on the 'old' physical entity A and remove the silent mode to start transmission from the 'new' physical entity B.

Applying UMTS standards (such as 3GPP TS 25.214) as an example, it is ultimately desired that the following expression (1) be satisfied:

$$P_B(k)=P_A(k-1)+P_{TPC}(k)+P_{bal}(k) \quad (1)$$

In expression (1), k is the slot number at the time of the switch between entities. The term $P_B(k)$ represents the power of the first transmitted slot from the new physical entity B. The term $P_A(k-1)$ denotes the power of the last transmitted slot from the old physical entity A, and the term $P_{TPC}(k)$ is the adjustment value in transmit power due to last received TPC command. Note that inner loop power control may be turned off. In the case that inner loop power control is turned off, the value $P_{TPC}(k)$ is always 0. The term $P_{bal}(k)$ represents an adjustment value for transmit power over one slot due to power balancing. Note that power balancing may be turned off. In the case that power balancing is turned off, the value $P_{bal}(k)$ is always 0.

Accordingly the transmit power from the first slot at physical entity B should be a function of the power of the last transmitted slot from physical entity A, the adjustment value from the last TPC command and the adjustment value for power balancing. However, since the latency of communication between physical entities is much greater in comparison with a slot duration, $P_A(k-1)$ is not available for physical entity B at the time it is needed to set the power for physical entity B for transmission. It is therefore desirable to find a solution which enables the use of an estimated transmit power value $\hat{P}_A(k-1)$ of $P_A(k-1)$ as shown in expression (1) where the error $\epsilon$ should stay below the required error margin.

$$|\hat{P}_A(k-1)-P_A(k-1)| \leq \epsilon \quad (2)$$

Since the power balancing algorithm between physical entities of the base station can be done on a slot basis or frame basis, the only changes in the algorithm that may affect the estimation $\hat{P}_A(k-1)$ is in the duration that is needed to achieve expression (2).

Power Balancing-Slot Basis

For a slot basis power balancing algorithm, the adjustment value in transmit power over one slot (i) due to power balancing, $P_{bal}(i)$ may be represented by expression (3):

$$P_{bal}(i)=(1-r)(P_{ref}-P(i-1)) \quad (3)$$

In expression (3), P (i−1) is the downlink transmit power at slot i−1, $P_{ref}$ represents a transmit power reference for this radio link to be around after the power balancing algorithms are executed. It is essentially the optimum long-term target power level. and r denotes an adjustment ratio that is between 0 and 1. Both $P_{ref}$ and r are configurable. $P_{ref}$ is chosen to maximize the system capacity, and r is chosen to achieve a balance between the convergence time and inner-loop power control performance. They can be configured in the field on the fly to achieve the best system performance.

The relation between the power level for slot i and slot i−1 for user X is shown by expression (4) for physical entity A and expression (5) for physical entity B:

$$P_A(i)=P_A(i-1)+P_{TPC}(i)+P_{bal}(i)=r \times P_A(i-1)+P_{TPC}(i)+(1-r)P_{ref}, \quad (4)$$

$$P_B(i)=P_B(i-1)+P_{TPC}(i)+P_{bal}(i)=r \times P_B(i-1)+P_{TPC}(i)+(1-r)P_{ref}, \quad (5)$$

Thus, expressions (4) and (5) illustrate that the downlink transmit power for slot i of user X by entities A and B are a function of the adjustment ratio r, the downlink transmit power at slot i−1, the adjustment value in transmit power due to last received TPC command $P_{TPC}$, and the transmit power reference $P_{ref}$ for the radio link to be around.

Expression (6) illustrates the difference between powers $P_A(i)$ and $P_B(i)$:

$$P_B(i)-P_A(i)=r \times (P_B(i-1)-P_A(i-1)). \quad (6)$$

Therefore using expression (6) recursively and looking at the difference at time k, we have expression (7):

$$P_B(k)-P_A(k)=r^{k-t} \times (P_B(t)-P_A(t)). \quad (7)$$

In expression (7), t represents the time for user X to get in synchronization on the uplink with the new physical entity B. This time is known at the base station. Since user X should also always be within a dynamic transmit power range of between $P_{MAX}$ and $P_{MIN}$ power, slot basis power balancing for call migration from the old physical entity A to the new physical entity B may thus be illustrated by expression (8):

$$|P_B(k)-P_A(k)| \leq r^{k-t} \times (P_{MAX}-P_{MIN}) \quad (8)$$

Accordingly, the upper bound of the absolute difference of user X's power between entities within the base station at any given slot k depends on the adjustment ratio r, in addition to the dynamic transmit power range that the transmit power of user X should be within. Since these parameters are known to the Node-B, the Node-B can compute the time difference k−t that will ensure the minimum time after which call migration can take place. In other words, using power balancing for call migration between two entities in the Node-B, may enable call migration to be achieved seamlessly between entities and transparently to entities outside of the Node-B. Thus, communication latency for call migration between physical entities in a Node-B may be substantially reduced and/or potentially eliminated as an influence on system or network performance. Parameters may be chosen from existing available information so as to reduce computational complexities and to alleviate processing burden, while ensuring that network performance remains substantially unaffected.

Power Balancing-Frame Basis

The expressions for frame basis power balancing to provide power control for user X for call migration from old physical entity A to new physical entity B are somewhat similar to slot basis power balancing described above. For example, expression (9) illustrates if there is a frame basis power balancing algorithm for the base station:

$$\sum_{i \text{ in period } N} P_{bal}(i) = (1-r)(P_{ref} - P(k_{N-1})). \quad (9)$$

In expression (9), $k_{N-1}$ is the slot number at the start of period N, and $k_N$ is the slot number at the end of period N (also the start of adjustment period N+1). N denotes the new adjustment period in units of frames. The term $P_{bal}(N)$ is the downlink power adjustment amount for the adjustment period N. Note that N may be in multiples of frames (1 frame is J slots), As before, $P_{ref}$ is the power reference that we need this radio link to be around after the power balancing procedure, and r is the adjustment ratio, a positive valued integer between 0 and 1.

If we look at user X in old physical entity A at any slot i, then expression (10) shows that:

$$P_A(i)=P_A(i-1)+P_{TPC}(i)+P_{bal}(i)=P_A(i-2)+P_{TPC}(i)+P_{TPC}(i-1)+P_{bal}(i)+P_{bal}(i-1) \quad (10)$$

Thus, it can be seen that:

$$P_A(k_N) = P_A(k_{N-1}) + \sum_N P_{TPC}(i) + P_{bal}(N), \quad (11)$$

thus $$P_A(k_N) = r \times P_A(k_{N-1}) + \sum_N P_{TPC}(i) + (1-r)P_{ref} \quad (12)$$

The same for user X in physical entity B:

$$P_B(k_N) = r \times P_B(k_{N-1}) + \sum_N P_{TPC}(i) + (1-r)P_{ref} \quad (13)$$

Looking at the difference between both powers, we have expression (14):

$$P_B(k_N) - P_A(k_N) = r \times [P_B(k_{N-1}) - P_A(k_{N-1})] \quad (14)$$

Therefore using expression (14) recursively and looking at the difference at time $k_N$, we have expression (15) below.

$$P_B(k_N) - P_A(k_N) = r^{N-N_0} \times [P_B(k_{N_0}) - P_A(k_{N_0})] \quad (15)$$

In expression (15), $N_0$ is the first adjustment period time just after user X got uplink synchronization on the new physical entity B. As before, r is chosen to achieve a balance between the convergence time and inner-loop power control performance. Parameters N and r may be configured and/or chosen in the field and on the fly (i.e., dynamically, in essentially real time) to achieve the desired system performance.

Since user X should also always be within a dynamic transmit power range of between $P_{MAX}$ and $P_{MIN}$, frame basis power balancing for call migration from the old physical entity A to the new physical entity B may thus be illustrated by expression (16):

$$P_B(k_N) - P_A(k_N) \leq r^{N-N_0} \times [P_{MAX} \times P_{MIN}] \quad (16)$$

Observing expressions (8) and (16), it can be shown that slot basis and frame basis power balancing algorithms arrive at the same general type of expression.

Accordingly, achieving the following expression (17) is thus only a function of knowing the number of timeslots k-t and/or adjustment periods $N-N_0$.

$$r^{N-N_0} \times [P_{MAX} - P_{MIN}] \leq \epsilon \text{ or } r^{k-t} \times (P_{MAX} - P_{MIN}) \leq \epsilon \quad (17)$$

Thus, if the slot basis power balancing algorithm is turned on at the base station, it is energized for a period of:

$$k - t = \left\lceil \frac{\ln\left(\frac{\epsilon}{P_{MAX} - P_{MIN}}\right)}{\ln(r)} \right\rceil \text{ slots;} \quad (18)$$

whereas a frame basis power balancing algorithm is only turned on for a period of:

$$N - N_0 = \left\lceil \frac{\ln\left(\frac{\epsilon}{P_{MAX} - P_{MIN}}\right)}{\ln(r)} \right\rceil \text{ Adjustment Periods} \quad (19)$$

where ln(x) is the natural logarithm of positive variable 'x'.

Based on the above expressions (18) and (19), it can be observed that there is no need to pass the estimated transmit power value from physical entity A to physical entity B, but instead power balancing may be turned on with a certain given adjustment ratio r, wait for a given duration as specified above in expressions (18) or (19), then switch to physical entity B, no matter what the starting power is on physical entity B.

The duration of convergence for $P_B(t)-P_A(t)$ may be upper-bounded with something smaller than $P_{MAX}-P_{MIN}$ by proper selection of the initial value of $P_B(t)$. For example, choosing:

$$P_B(t) = \frac{P_{MAX} - P_{MIN}}{2} \quad (20)$$

we have $$|P_B(t) - P_A(t)| \leq \frac{P_{MAX} - P_{MIN}}{2}. \quad (21)$$

Therefore, choosing the right initial power for physical entity B may make convergence faster. Additionally, the parameters $P_{ref}$, r, slots or adjustment period length and $\epsilon$ may be selected so the difference in power does not have any impact on the performance of the network or system (i.e., the error of $\epsilon$ is achieved after the power balancing operation with proper choices of parameters $P_{ref}$, r, adjustment period length, as shown in the examples above).

FIG. 1 is a flow diagram illustrating a general process flow for controlling transmit power for a user call migrating between a first entity and a second entity in a base station, in accordance with an example embodiment of the present invention. FIG. 1 is provided to generally describe how power control may be performed as a call of the user X is migrated from physical entity A to physical entity B, or vice versa, based on the adjustment ratio value r.

Referring to FIG. 1, once the base station makes the determination (for whatever reason) that a user call needs to be migrated between entities (S10), existing information (dynamic power range for user X and the synchronization time t (slot-basis) or the first adjustment period time $N_0$ just after user X got uplink synchronization on the new physical entity B (frame-basis) at the base station is gathered or acquired (S40), it is determined whether slot-based or frame-based power balancing (power control) is to be performed (S30). If slot-based power balancing is to be performed (output of S30 is 'yes'), the difference or error margin between the entities is determined per expressions (2) and (8) so as to satisfy (i.e., be below) an acceptable error (S40), and the slot k and adjustment ratio value r is selected (S50, dynamically).

Similarly, for frame-based power balancing (output of S30 is 'no'), the difference or error margin between the entities is determined per expressions (2) and (16) so as to satisfy (i.e., be below) the acceptable error (S45), and the parameters r and N may be selected on the fly (S55). For each of slot-based and frame-based power balancing, the call may then be migrated (S60) from physical entity A to physical entity B within the base station, as shown in FIG. 1. Accordingly, parameters for balancing transmit power between the entities as the user call is migrated may be selected so that any difference in transmit power does not adversely affect system performance.

The example embodiments may thus provide an algorithm that is relatively uncomplicated, and which only uses parameters from readily available information at the base station. The conventional approach to power balancing for call migration was to report the power $P_A(k\text{-}s)$ ('s' accounts for the latency between the communication time between entity A and entity B, in units of slots or frames) from physical entity A to physical entity B, after which physical entity B reapplied the full power control algorithm using $P_A(k\text{-}s)$ until slot k. This meant that physical entity B was required to store all the information needed to compute the power control algorithm for a minimum period of k-s, which as mentioned above could be on the order of 10 to 40 frames for some UMTS designs.

Also, there is a need for sufficient processing power to ensure that, e.g., 40 frames, of power control adjustment can be achieved within a single timeslot. This is because once the $P_A(k\text{-}s)$ is received, the power to be applied at physical entity B needs to be calculated as soon as possible and applied for the downlink transmission of user X. Otherwise the storage requirement keeps increasing such that more power control commands need to be buffered.

The proposed methodology uses existing information and, only in case where power balancing is turned off, will be turned on for a substantially short period of time. Thus, no additional memory or processing power is needed to achieve call migration seamlessly between entities and transparently to entities outside of the Node-B. Additionally as described previously above, parameters may be chosen so performance is substantially unaffected. Therefore, as all the information needed for the example methodology is available at the base station (and is not mobile or environment-specific), the example methodology described herein may be substantially efficient and robust so as to avoid any capacity loss, while being substantially cost effective.

The above methodology may be employed for any network based on one or more of CDMA (IS95, cdma2000 and various technology variations), UMTS (release 99, R4, R5, R6 and above), GSM, 802.11 and/or related technologies, including communication systems or networks based on technologies other than the above, which may be in various stages of development and intended for future replacement of, or use with, the above networks or systems.

The example embodiments of the present invention being thus described, it will be obvious that the same may be varied in many ways. Such variations are not to be regarded as departure from the spirit and scope of the example embodiments of the present invention, and all such modifications as would be obvious to one skilled in the art are intended to be included within the scope of the following claims.

What is claimed is:

1. A method of controlling transmit power for a user call comprising:
   performing power control, as a call of the user is migrated from a first physical entity in a base station to a second physical entity in the base station, or vice versa, based on an adjustment ratio value related to balancing power between the first and second physical entities during the call migration, the first physical entity implementing a first transmission characteristic and the second physical entity implementing a different transmission characteristic than that of the first entity, the power control being performed on a slot-by-slot or frame-by-frame basis so as to maintain a shift in transmit power between the physical entities below an error value.

2. The method of claim 1, wherein the adjustment ratio value is a positive integer between 0 and 1.

3. The method of claim 1, wherein said performing power control is additionally a function of a dynamic transmit power range for the user.

4. A method of controlling transmit power for a user call migrating between a first entity and a second entity in a base station, comprising:
   performing power control, as a call of the user is migrated from the first to the second entity, or vice versa, based on an adjustment ratio value, the performing power control balancing transmit power as the call is switched from the first entity to the second entity, or vice versa, so that a difference in transmit power between the entities is less than or equal to $r^{k-t} \times (P_{max} - P_{min})$, where r is the adjustment ratio value, k is a given timeslot, t is the time for the user to get synchronized in the uplink with one of the first or second entity at the base station, and $P_{max} - P_{min}$ represents a dynamic transmit power range between which the transmit power of the user is in.

5. A method of controlling transmit power for a user call migrating between a first entity and a second entity in a base station, comprising:
   performing power control, as a call of the user is migrated from the first to the second entity, or vice versa, based on an adjustment ratio value, the performing power control balancing transmit power as the call is switched from the first entity to the second entity, or vice versa, so that a difference in transmit power between the entities is less than or equal to $r^{N-N0} \times (P_{max} - P_{min})$, where r is the adjustment ratio value, $N-N_0$ is an adjustment period spanning one or more frames, and $P_{max} - P_{min}$ represents a dynamic transmit power range between which the transmit power of the user is in.

6. A method of selecting parameters for balancing transmit power as a user call is migrated comprising:
   selecting one or more parameters dynamically for balancing transmit power between a first physical entity in a base station and a second physical entity in the base station as the user call is migrated so that any difference in transmit power does not adversely affect system performance, the first physical entity implementing a first transmission characteristic and the second physical entity implementing a different transmission characteristic than that of the first entity, the one or more selectable parameters including at least one of an adjustment ratio r and an adjustment period spanning one or more frames.

7. The method of claim 6, wherein one or more parameters are chosen so as to balance a desired convergence time with desired inner loop power control performance degradation.

* * * * *